United States Patent [19]

Song

[11] Patent Number: 5,893,832

[45] Date of Patent: Apr. 13, 1999

[54] TRANSDUCER ELEMENT ALIGNMENT STRUCTURE IN TWO-DIMENSIONAL TRANSDUCER ARRAY FOR FORMING ULTRA-SONIC THREE-DIMENSIONAL IMAGES

[75] Inventor: Tai-Kyong Song, Seoul, Rep. of Korea

[73] Assignee: Medison Co., Ltd., Rep. of Korea

[21] Appl. No.: 08/881,058

[22] Filed: Jun. 24, 1997

[30] Foreign Application Priority Data

Jun. 25, 1996 [KR] Rep. of Korea ............ 96-23662

[51] Int. Cl.⁶ .................................................. A61B 8/00

[52] U.S. Cl. ........................................ 600/443; 600/459

[58] Field of Search ................................ 600/447, 443, 600/459, 439

[56] References Cited

U.S. PATENT DOCUMENTS 5,563,346 10/1996 Bartelt et al. ............................ 600/447
5,720,708 2/1998 Lu et al. ................................... 600/447

*Primary Examiner*—William E. Kamm
*Assistant Examiner*—Maulin Patel
*Attorney, Agent, or Firm*—Dilworth & Barrese

[57] ABSTRACT

A transducer element alignment structure for use with a two-dimensional transducer to form an ultrasonic three-dimensional image performs a three-dimensional scanning by using the smallest number of elements, wherein a number of transducer elements are aligned on a plurality of concentric circular grids. The first element is aligned at a location on each grid and the other elements are aligned at a respective location so that the circumferential distance between the elements has the same arc length, to thereby construct a simple system and effectively form ultrasonic three-dimensional images.

8 Claims, 3 Drawing Sheets

TRANSDUCER ELEMENT ALIGNMENT STRUCTURE IN TWO-DIMENSIONAL TRANSDUCER ARRAY FOR FORMING ULTRA-SONIC THREE-DIMENSIONAL IMAGES

BACKGROUND OF THE INVENTION

1. Technical Field

The present invention relates to a transducer element alignment structure for use with a two-dimensional transducer array to form an ultrasonic three-dimensional image, and more particularly, to a transducer element alignment structure for use with a two-dimensional transducer array which can form an ultrasonic three-dimensional image by aligning a small number of elements on a circular grid.

2. Discussion of Related Prior Art

A medical ultrasonic system for displaying sectional structure and blood stream information in a human body as images is an essential piece of medical image diagnostic equipment. Ultrasonic three-dimensional image diagnostic equipment for providing three-dimensional images of medical information has recently been developed. However, to form an ultrasonic three-dimensional image, a large amount of scanning time and a complicated ultrasonic system is needed. A mechanical three-dimensional scanning method which takes a very long time to obtain a signal for forming three-dimensional images is influenced by the respiratory activity of a patient. More specifically, it is difficult to obtain reliable ultrasonic signal data from a patient using the above method, since the patient cannot stop breathing for the required length of time.

To reduce the required time to perform a three-dimensional scanning, a two-dimensional transducer array can be used. However, in the case when the two-dimensional transducer array is used, the system becomes very complicated due to the required number of transducer elements. Thus, in order to form an ultrasonic three-dimensional image by using a two-dimensional transducer array, a scheme for reducing the number of elements in the transducer array is inevitably needed.

SUMMARY OF THE INVENTION

To solve the above problems, it is an object of the present invention to provide a transducer element alignment structure for use with a two-dimensional transducer array which can form ultrasonic three-dimensional images, and a simple system for aligning a number of transducer elements on a circular grid.

To accomplish the above object of the present invention, there is provided a transducer element alignment structure for use with a two-dimensional transducer array for three-dimensional scanning in an ultrasonic three-dimensional image generator, such that a number of transducer elements are aligned on a plurality of concentric circular grids.

BRIEF DESCRIPTION OF THE DRAWINGS

The preferred embodiments are described with reference to the drawings wherein.

DETAILED DESCRIPTION OF THE INVENTION

A preferred embodiment of the present invention will be described in detail with reference to the accompanying drawings.

To prevent an increase in a side lobe due to a random array of transducer elements, the elements should be aligned so that the field of each element is randomly added near a main lobe. In the present invention, the elements are randomly aligned on circular grids rather than square grids, to thereby reduce a grating lobe and simultaneously prevent the level of the side lobe from rising.

Figure 1:
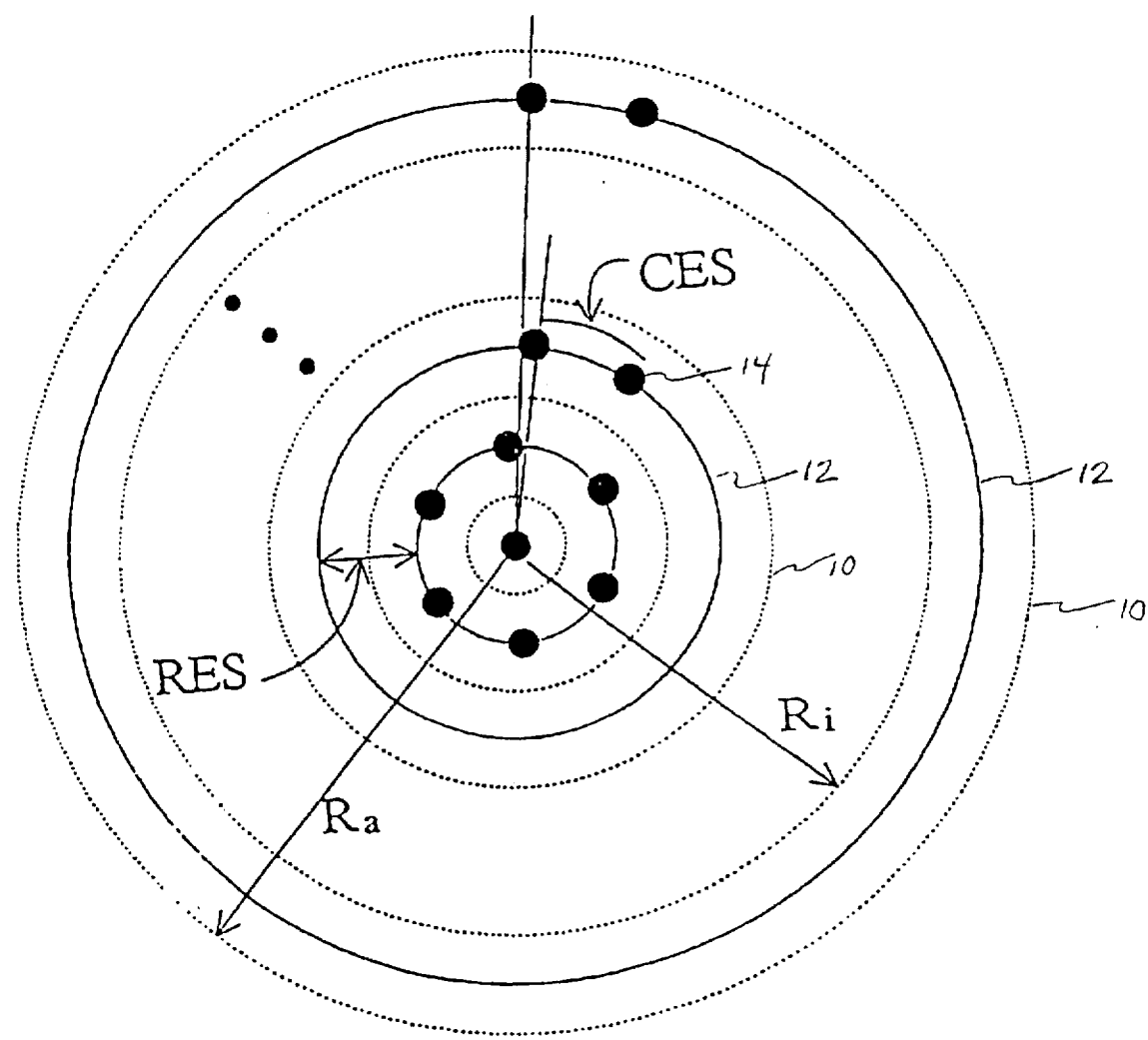
FIG. 1 is a view showing a transducer element alignment structure for use with a two-dimensional transducer array according to the present invention.

FIG. 1 is a view showing a transducer element alignment structure for use with a two-dimensional transducer array according to the present invention. In FIG. 1, circular apertures 10 are indicated by dotted lines. Also, one circular aperture is displaced from another according to a predetermined relationship. That is, a circular aperture having a radius Ra is composed of Nc circles or dotted lines having the following equation.

$$R_i - R_{i-1} = 2 \cdot R_1 = \text{constant}, i = 3, 4, \ldots, N_c$$

Here, $R_i$ is a radius of the i-th circular aperture.

The transducer elements 14 are located on the concentric circles 12 indicated by solid lines between the circular apertures 10. A first element is aligned at a location on each circle and the other elements are aligned at a respective location so that the circumferential distance between the elements has the same arc length. The distance between the transducer elements 14 on each circle 12 (i.e., arc length) indicated by the solid line is referred to as a circular element spacing (CES). The radial distance between the circles 12 is referred to as a radial element spacing (RES), which has a uniform distance.

In the element alignment structure for use with a two-dimensional transducer array shown in FIG. 1, the first element is aligned at any location on each grid to obtain a smaller grating lobe value. Also, since the elements are uniformly distributed in the circular direction, the size of the side lobe does not increase. The sidelobe and grating lobe levels can be separately controlled by adjusting the values of RES and CES, respectively.

Figure 2:
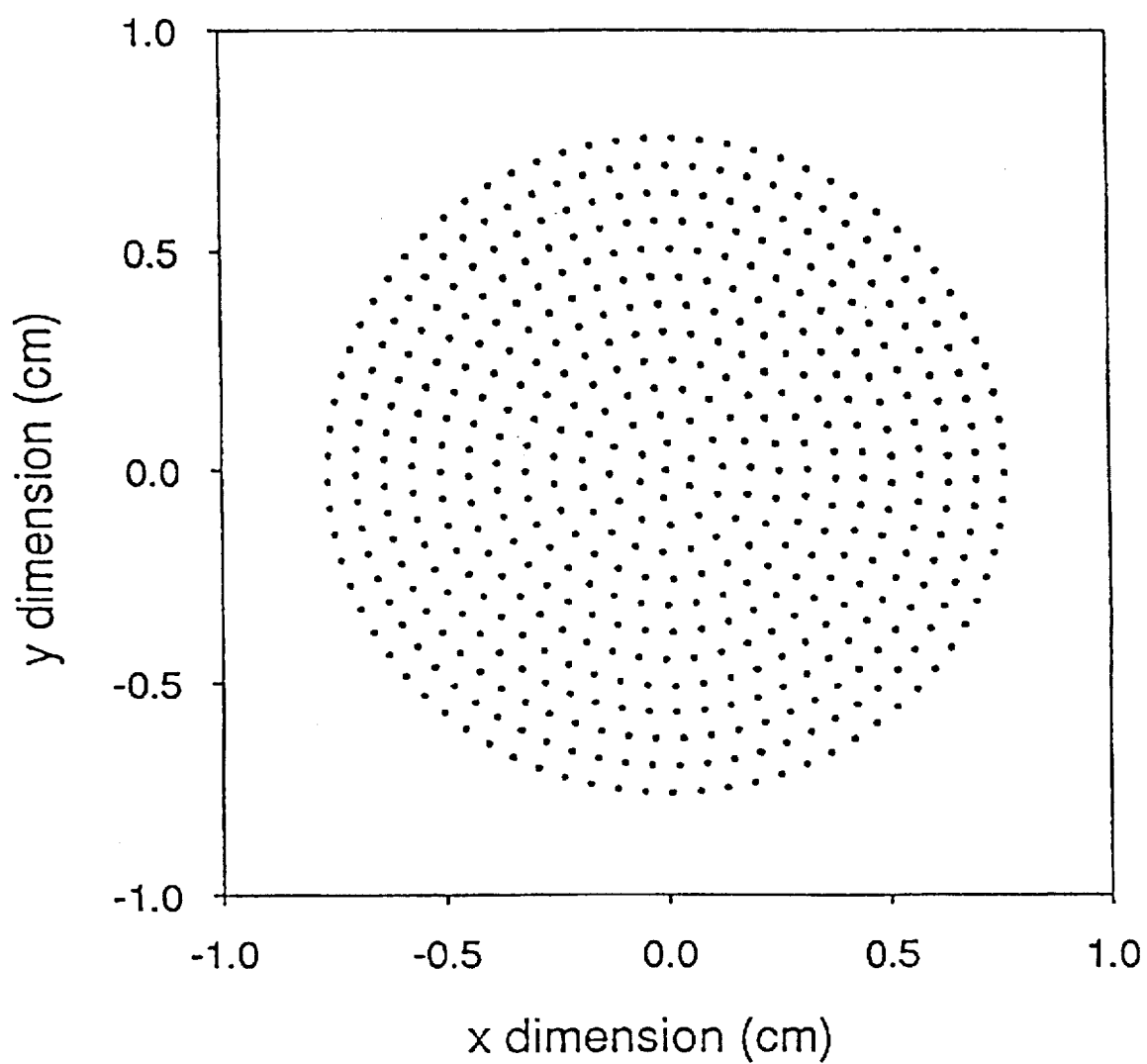
FIG. 2 is a view showing a two-dimensional transducer array in which 499 transducer elements are aligned by the FIG. 1 alignment structure.

FIG. 2 shows a two-dimensional transducer in which 499 elements are aligned by the alignment structure illustrated in FIG. 1.

Figure 3A:
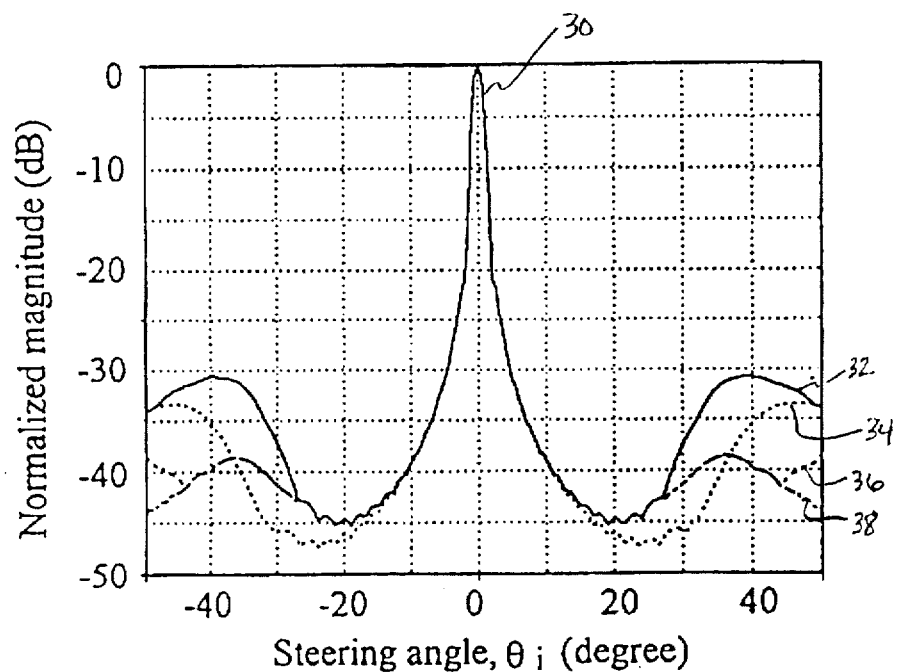
FIGS. 3A and 3B are graphical views showing a field response of beams corresponding to a number of RES and CES values, respectively.
Figure 3B:
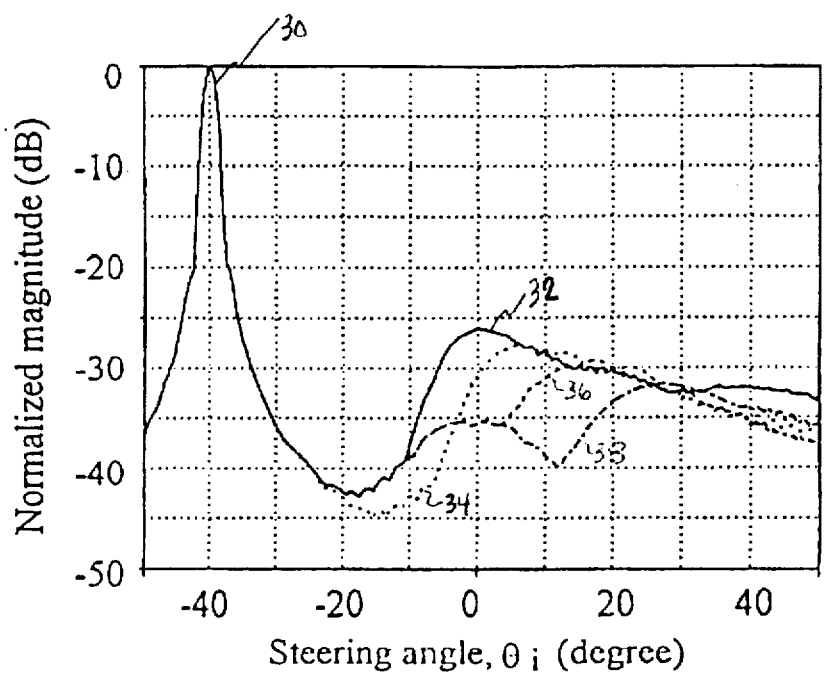

FIGS. 3A and 3B are graphical views showing field response of beams according to the transducer element alignment structure in the two-dimensional transducer array corresponding to a number of RES and CES values, respectively. Here, FIG. 3A shows the field response when a main lobe 30 is located at an angle of 0°, and FIG. 3B illustrates the main lobe 30 located at an angle of −40°.

The solid lines 32 shown in FIGS. 3A and 3B show field responses of the beams with respect to the transducer array composed of 499 elements having RES of 1.4λ and CES of 1.2λ when the center frequency is 3.5 MHz and the diameter is 1.584 cm corresponding to 38λ. The dotted lines 34 show field responses of the beams with respect to the transducer array composed of 673 elements having RES of 1.4λ and CES of 1.2λ. The intermittent solid lines 36 show field responses of the beams with respect to the transducer array composed of 703 elements having RES of 1.2λ and CES of 1.0λ. The dotted and intermittent solid lines 38 show field responses of the beams with respect to the transducer array composed of 877 elements having RES of 1.4λ and CES of 0.8λ.

As shown in FIGS. 3A and 3B, as the RES gets smaller, the size of the side lobe is reduced. The value of the grating lobe is reduced according to the CES value. Thus, the RES and CES are controlled via the element alignment structure in the two-dimensional transducer array, in order to reduce the side lobe and the grating lobe. Also, the transducer array comprised of 499 elements has a smaller grating lobe than that of the transducer array comprised of 625 elements.

As described above, the element alignment structure for use with the two-dimensional transducer array according to the present invention can reduce the number of the elements when the system is constructed, to effectively form ultrasonic three-dimensional images.

While only certain embodiments of the invention have been specifically described herein, it will be apparent that numerous modifications may be made thereto without departing from the spirit and scope of the invention.

What is claimed is:

1. A transducer element alignment structure for use with a two-dimensional transducer array for three-dimensional scanning to form an ultrasonic three dimensional image, comprising: a plurality of transducer elements aligned on a plurality of concentric circular grids, said plurality of transducer elements being aligned at a respective location on each of said plurality of circular grids such that a circumferential distance between the transducer elements has a substantially equal arc length.

2. The transducer element alignment structure according to claim 1, wherein each of said plurality of circular grids are displaced from one another according to a predetermined relationship.

3. The transducer element alignment structure according to claim 1, wherein each of said plurality of circular grids define Nc concentric circular apertures according to the following equation:

$$R_i - R_{i-1} = 2 \cdot R_1 = \text{constant}, i = 3, 4, \ldots, N_c$$

wherein $R_i$ is a radius of the i-th circular aperture.

4. The transducer element alignment structure according to claim 3, wherein each circular grid within said plurality of circular grids is located equidistant between two adjacent circular apertures.

5. A method of ultrasonic imaging, comprising the steps of:

aligning transducer elements of a two-dimensional transducer on a plurality of concentric grids, said transducer elements being aligned on each concentric grid such that a circumferential distance between the elements is substantially equal;

scanning in three dimensions using the two-dimensional transducer; and forming a three dimensional image from said scanning.

6. The method as claimed in claim 5, further comprising the step of:

defining a plurality of concentric circular apertures in the two-dimensional transducer, each of said plurality of circular grids being located substantially equidistance between two adjacent circular apertures.

7. The method as claimed in claim 6, wherein said step of defining is performed according to the following equation:

$$R_i - R_{i-1} = 2 \cdot R_1 = \text{constant}, i = 3, 4, \ldots, N_c$$

wherein $R_i$ is a radius of the I-th circular aperture.

8. The element alignment structure as claimed in claim 1, wherein said plurality of transducer elements are uniformly distributed in each radial direction on said plurality of concentric grids in order to obtain desired grating lobe and side lobe values.

* * * * *